Dec. 24, 1940.　　A. E. ANDERSON　　2,226,087
PORTABLE MILKING MACHINE
Filed Dec. 23, 1937
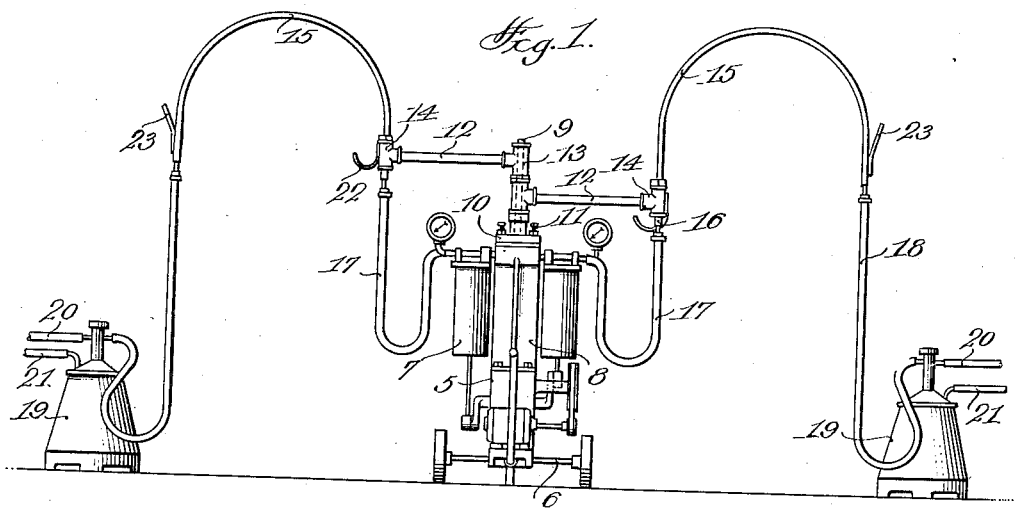
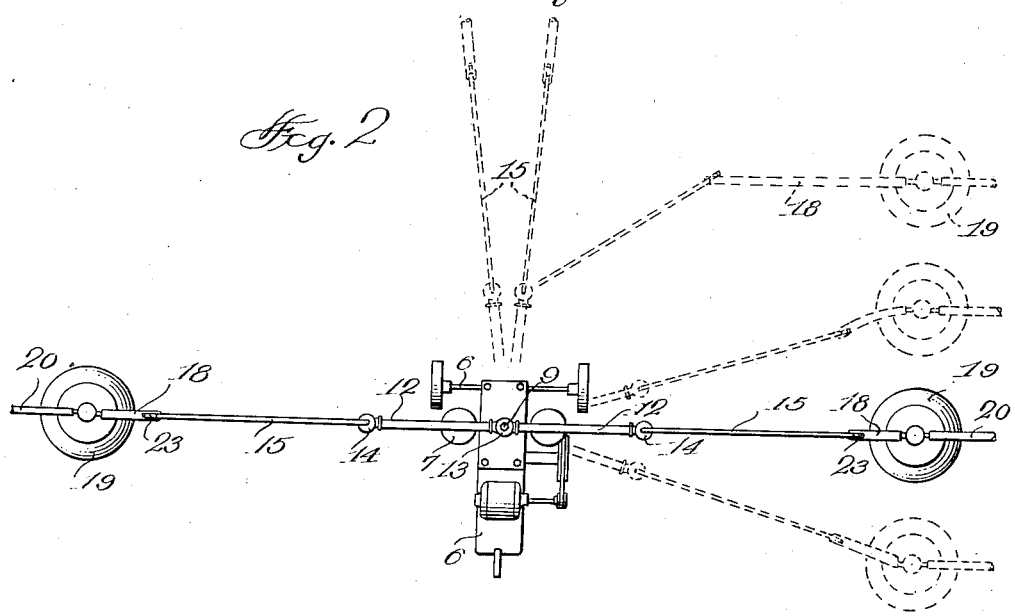
Inventor
Austin E. Anderson
By Ralph Burch
Attorney Patented Dec. 24, 1940

2,226,087

UNITED STATES PATENT OFFICE 2,226,087

PORTABLE MILKING MACHINE

Austin E. Anderson, Jamestown, N. Y., assignor to Anderson Milker Co., Inc., Jamestown, N. Y., a corporation of New York Application December 23, 1937, Serial No. 181,435

5 Claims. (Cl. 31—73)

This invention relates to improvements in portable milking machines and particularly to that type of machine wherein the pumping unit is mounted on a truck and flexible conduits are employed to connect the pumping unit with the milk pail and teat-cups.

In practice, it has been found difficult to support the air conduits, between the pumping unit and milk pails, above the floor and out of the dirt and at the same time permit free movement of the operator around the pumping unit.

It is the primary object of the present invention to provide supporting means for the air conduits which will keep the conduits off the floor and at the same time permit the operator to freely move around the machine without having to duck under or step over the conduits.

A further object of the invention resides in providing supporting means of the above character which is readily adjustable with respect to the pumping unit, so that the air conduits may be supported from both sides of the pumping unit or from only one side, permitting the milking of two or more cows simultaneously on one side of the machine or one or more cows on opposite sides thereof.

Another object of the invention resides in providing means of the above-mentioned character which is simple and durable in construction, efficient in use and inexpensive to manufacture.

Other objects of the invention will be apparent during the course of the following description.

In the accompanying drawing, forming a part of this specification and in which like numerals are employed to designate like parts throughout the same;

Fig. 1 is an elevation of a portable milking machine, showing my improvements applied thereto, and, Fig. 2 is a top plan view showing the relative positions of the supporting means.

In the drawing, wherein for the purpose of illustration I have shown a preferred embodiment of my invention, the numeral 5 denotes generally a pumping unit of a portable milking machine mounted on a wheeled truck 6, with the air pumping cylinders 7 mounted on opposite sides of a standard 8.

Referring more particularly to my improvements an upright post 9 is mounted on top of the standard 8 by means of a base plate 10 secured to the standard 8 by bolts 11. A pair of laterally swinging tubular arms 12 are pivotally connected to the post 9 by T-connections 13 disposed one above the other so that the arms 12 swing in different horizontal planes. The outer free end of each of the arms 12 connects with the lateral bore of a T-fitting 14, the upper end of the longitudinal bore of the fitting receiving one end of an arched metal conduit 15 which is mounted to turn completely around in the fitting. A nipple 16 is fitted in the lower end of the longitudinal bore of each of the fittings 14 and projects therefrom for connection with one end of the flexible air conduits 17 which have their opposite ends connected to the air pump cylinders 7. The free ends of the arched metal conduits 15 are connected by flexible air conduits 18 to the milk pails 19, which are connected by air tubes 20 and milk tubes 21 with the teat-cups, not shown. On the outward stroke of the pump piston a suction is created in the milk pail and air tube 20 and milk tube 21 which expands the teat cup and draws the milk into the pail. On the inward stroke of the pump piston the air drawn from the milk pail and teat cups is driven back to compress the teat cups to produce the squeeze of the teat. A hook 22 is attached to the outside of each of the fittings 14 for supporting the sets of teat-cups, milk pail covers, etc., when not in use. Also the free ends of the arched metal conduits 15 are provided with hook bars 23 for supporting the flexible conduits 18 when disconnected and not in use. While the arched metal conduits 15 are shown connected to the air pump cylinders by flexible conduits it is obvious that the pumps may be connected with the lateral arms 12 and air conveyed by the arms to the arched conduits.

In operation, the pumping unit is disposed centrally of the passageway between the rows of stalls and cows on opposite sides of the passageway are milked at the same time. The arms 12 and arched conduits 15 are adjusted to extend from opposite sides of the pumping unit in the direction of the stall of the cow being milked. The arched conduit 15 is sufficiently high so that a person may walk beneath the same without ducking and at the same time keeps the flexible conduits off the floor and out of the dirt. The arms 12 and conduits 15 are readily adjustable to various positions, as shown in Fig. 2, so that if desired two or more cows may be milked from one side of the pumping unit at the same time. When not in use the arms and arched conduits may be folded into line with the longitudinal axis of the truck, so that the machine may be easily moved from place to place. Thus, it is seen, that in place of a single flexible conduit between the pumping unit and milk pails, I have interposed in the air line a rigid arched conduit, connected by sections of flexible conduits with the pumping unit and milk pail, so that the air line is completely out of contact with the floor and ample space is provided beneath the arched conduit to permit unobstructed passage of the operator in carrying milk from the barn. In some instances it may be desirable to employ a continuous flexible conduit between the pumping unit and milk pails, in which case the flexible conduit would be suspended or attached to the arched conduit 15, which would then serve merely as a support for the flexible conduit.

It is to be understood that the form of my invention herein shown and described is to be taken as a preferred example of the same and that certain changes in the shape, size and arrangement of the parts may be made without departing from the spirit of the invention or the scope of the subjoined claims.

Having thus described my invention, I claim:

1. In a portable milking machine, a wheeled truck adapted to be positioned in the center of the alley of a cow barn, an air and suction pumping unit mounted on said truck, a milk pail adapted to be positioned adjacent a cow stall, an air line extending between said pumping unit and said milk pail, and a rigid arched conduit interposed in said air line and connected to the frame of said pumping unit, the arms of said arched conduit being substantially parallel at all times and spaced apart a sufficient distance so that when the conduit is in operative position it will extend across a space of a width substantially greater than that normally occupied by a man.

2. In a portable milking machine, a wheeled truck adapted to be positioned in the center of the alley of a cow barn, an air and suction pumping unit mounted on said truck, a milk pail adapted to be positioned adjacent a cow stall, a rigid arched conduit pivotally mounted on said pumping unit, the arms of said arched conduit being substantially parallel at all times and spaced apart a sufficient distance so that when the conduit is in operative position it will extend across a space of a width substantially greater than that normally occupied by a man, an air tube connecting the inner end of said conduit with said pumping unit, and an air tube connecting the outer end of said conduit with said milk pail.

3. In a portable milking machine, a wheeled truck adapted to be positioned in the center of the alley of a cow barn, an air and suction pumping unit mounted on said truck, a vertical post mounted on top of the pumping unit, laterally swinging arms pivotally mounted on said post to swing in different horizontal planes, milk pails adapted to be positioned adjacent the cow stalls, rigid arched conduits pivotally connected at one end to the outer ends of said arms, the arms of said arched conduits being substantially parallel at all times and spaced apart a sufficient distance so that when the conduits are in operative position they will extend across a space of a width substantially greater than that normally occupied by a man, air line tubes connecting the inner end of each of said conduits to said pumping unit, and air line tubes connecting the outer end of each of said conduits with one of said milk pails.

4. A portable milking machine including a wheeled truck adapted to be positioned in the center of the alley of a cow barn, an air pumping and suction unit mounted on said truck, a milk pail adapted to be positioned adjacent a cow stall, an air conduit connecting said pumping unit with said pail, and a rigid arched supporting member for said air conduit mounted on said truck, the arms of said arched member being substantially parallel at all times and spaced apart a sufficient distance so that when the arched member is in operative position it will extend across a space of a width substantially greater than that normally occupied by a man.

5. A portable milking machine including a wheeled truck adapted to be positioned in the center of the alley of a cow barn, an air pumping and suction unit mounted on said truck, a milk pail adapted to be positioned adjacent a cow stall, an air conduit connecting said pumping unit with said pail, and a rigid arched supporting member for said air conduit mounted on said truck for lateral swinging movement, the arms of said arched member being substantially parallel at all times and spaced apart a sufficient distance so that when the arched member is in operative position it will extend across a space of a width substantially greater than that normally occupied by a man.

AUSTIN E. ANDERSON.